United States Patent [19]
McCoy et al.

[11] Patent Number: 6,156,483
[45] Date of Patent: Dec. 5, 2000

[54] INTEGRATED OPTICAL DEVICES

[75] Inventors: Michael Anthony McCoy, Coggeshall; Ian Croston, Maldon, both of United Kingdom

[73] Assignee: SDL Integrated Optics Limited, United Kingdom

[21] Appl. No.: 09/175,285

[22] Filed: Oct. 20, 1998

[30] Foreign Application Priority Data

Oct. 21, 1997 [GB] United Kingdom ............... 9722250

[51] Int. Cl.[7] .................... G03C 5/00; H01L 41/04
[52] U.S. Cl. ............................... 430/311; 310/344
[58] Field of Search .................... 430/311, 312, 430/313; 310/348, 344; 385/51

[56] References Cited

U.S. PATENT DOCUMENTS 4,119,363  10/1978  Camlibel ........................ 350/96.2
5,068,865  11/1991  Ohshima et al. ................ 372/36
5,925,973  7/1999  Eda et al. ...................... 310/348

Primary Examiner—S. Rosasco
Attorney, Agent, or Firm—McGlew and Tuttle, P.C.

[57] ABSTRACT

In a method of manufacturing an integrated optical device using a wafer of lithium niobate, an optical waveguide is formed in the wafer by diffusing from a surface thereof a metal such as titanium, nickel or zinc and which changes the refractive index of the lithium niobate. A chemical vapor deposition process is used to deposit on the wafer surface a silicon dioxide buffer layer, the process being operated with the temperature of the wafer substantially in the region of about 170° C. to 225° C. A metallic electrode array is deposited on the silicon dioxide buffer layer, and then the wafer is mounted in a package, with suitable optic and electric connections being made thereto. The package is hermetically sealed to protect the connected wafer from the environment.

20 Claims, 5 Drawing Sheets

Initial I-V Measurements
Hermetic Lithium Niobate Modulator After Extended Aging at 70C

INTEGRATED OPTICAL DEVICES

BACKGROUND TO THE INVENTION a) Field of the Invention

This invention relates to a method of manufacturing an integrated optical device and also to devices manufactured by the method of this invention.

b) Description of the Prior Art

Telecommunication networks using optical fibre technology are used very widely for the high speed transmission of data, throughout the developed world. Such links are able to operate with individual channel data rates of at least 2.5 Gb/s though up to 10 Gb/s can be achieved, and with wavelength division multiplexing, the capacity of an individual fibre can be increased to 40 Gb/s up to 80 Gb/s.

With such high data transmission rates, it is most important that the various components deployed throughout a telecommunication network are able to operate reliably, for most extended period of time. The most common approach to increasing the reliability of such a component is to seal the active or passive device into a package such that a perfect hermetic seal is formed, isolating the component from the ambient conditions.

The hermetic sealing of a device such as a semi-conductor laser or a detector is well-known, for example from U.S. Pat. No. 5,068,865 (NEC Corporation) or U.S. Pat. No. 4,119,363 (Bell Laboratories). It has been presumed that the same techniques may be employed for the manufacture of lithium niobate devices using a wafer of lithium niobate in which is manufactured an optical modulator or an optical filter. However, reliability trials and tests have shown that a significant number of lithium niobate devices manufactured by conventional semi-conductor techniques have failed very much earlier than would be expected, and typically after only a few hundred hours of operation.

A typical manufacturing cycle for a lithium niobate device comprises the steps of:

production by photolithography of an optical waveguide pattern on a surface of a lithium niobate wafer;

deposition of titanium on the pattern, with a line width in the range of 5–8 $\mu$m and a thickness in the region of 700–1100 Å;

diffusion of titanium into the lithium niobate by heating the wafer in a controlled atmosphere, for a period of between 6–12 hours at a temperature of between 1010° C. to 1050° C.;

deposition of a silicon dioxide buffer layer over said surface of the wafer;

annealing of the silicon dioxide buffer layer;

production by photolithography of the required electrode pattern on the buffer layer;

deposition of chrome/gold electrodes on the electrode pattern; and etching of the buffer layer, from the gaps between the electrodes.

Following the manufacture of the wafer, the component is packaged to complete the device, ready for supply to a user, by the following steps:

mounting the wafer within a metallic container (package);

connecting short lengths of optical fibres ("pigtails") to the optical waveguides and wires to the electrodes, the pigtails and the wires extending through suitable openings in the container and being hermetically sealed thereto;

baking the package and component in a seam-sealer under dry nitrogen, typically for periods of about 4 to 24 hours at temperatures between 60° C. and 125° C.; and seam-sealing a lid to the container to complete the package.

After a few hundred hours of testing, approximately 50% of devices manufactured as described above have exhibited a phenomenon known as "fast bias drift" $(FBD)_1$ where the bias required to achieve quadrature rapidly increases with time. The time constant of such FBD observed was typically of the order of a few seconds.

It has been reported in the literature that there are certain material effects which can lead to a change in the required bias voltage. The research has however shown that the material effects give rise to time constants of the order of minutes for thermal effects, through to hours for "standard" DC drift phenomena. $FBD_1$ with a time constant of the order of a few seconds, has not previously been reported in the literature.

Research into the FBD failure has given rise to a partial understanding of the mechanism by which FBD failure of a device can occur. It appears as though lithium migrates from the lithium niobate wafer into the silicon dioxide buffer layer during the annealing stage of the silicon dioxide layer which annealing is performed typically at a temperature in the range of 500–600° C., in an atmosphere of flowing oxygen, for a period of several hours. A corresponding annealing step is well-known in the electronics industry where the densification of a silicon dioxide buffer layer can be employed to improve the electrical properties of a device. However, in a lithium niobate device, the surficial layer of the lithium niobate is damaged by the migration of lithium into the silicon dioxide, the damaged layer thus being depleted of lithium oxide:

$$3LiNbO_4 \rightarrow LiNb_3O_8 + 2LiO_2$$

In an attempt to overcome the above problem, investigations have been made into possible manufacturing methods for producing the silicon dioxide layer which may obviate the annealing step of the known manufacturing process. As a result, it has been established that it is possible to perform a chemical vapour deposition process (CVD process) to deposit the silicon dioxide buffer layer on a lithium niobate wafer, at a temperature significantly lower than would be expected to be possible for such a process and that by operating within this temperature region, no further annealing step at an elevated temperature is required.

SUMMARY OF THE INVENTION

According to this invention, there is provided a method of manufacturing an integrated optical device, comprising the steps of:

forming a optical waveguide in a wafer of lithium niobate by diffusing into the wafer from a surface thereof a material which changes the refractive index of the lithium niobate;

using a chemical vapour deposition process to deposit on said surface of the wafer a silicon dioxide buffer layer, with the temperature of the wafer substantially in the region of about 170° C. to 225° C.;

depositing on the silicon dioxide buffer layer a metallic electrode array; and mounting the wafer in a package, effecting suitable optic and electric connections thereto and hermetically sealing the component inside the package.

This invention extends to an integrated optical device whenever made by a method of this invention, as described above.

BRIEF DESCRIPTION OF THE DRAWINGS

The drawings show various aspects associated with the manufacturing method of this invention and examples thereof. In the drawings.

DESCRIPTION OF THE PREFERRED ARRANGEMENTS AND PROCEDURES

When performing the method of this invention, the optical waveguide in the lithium niobate may be produced in a number of different ways. Conventionally, that waveguide may be formed by depositing material comprising a metal or a metal-bearing compound on the wafer, and diffusing metal from the deposited material into the wafer by soaking the wafer and the deposited material at an elevated temperature for an extended time. Typically, the deposited material comprises one of titanium, titanium dioxide, nickel, zinc and zinc dioxide. A photolithography step may be performed to define the regions where the material is to be deposited, in a manner known in the art.

In an alternative process, the optical waveguide may be formed by defining on the surface of the wafer the required optical waveguide pattern and then immersing the wafer in a source of protons at an elevated temperature, for an extended time. Such a source of protons may comprise benzoic acid, sulphuric acid, phosphoric acid and tolaic acid.

The silicon dioxide layer is, in the present invention, formed by way of a chemical vapour deposition process, which advantageously is either a plasma-enhanced process (PECVD process) or an electron cyclotron resonance process (ECRCVD process).

By enhancing and refining such processes, it has been established that it is possible to operate with a wafer temperature significantly lower than had previously been thought possible, whilst still achieving a satisfactory buffer layer. By utilising lower temperatures, damage to the wafer surficial layer can largely, or even wholly, be eliminated.

The thickness of the deposited silicon dioxide layer must be sufficient to give adequate insulating properties for the electrodes which are in turn formed on the silicon dioxide layer. The target thickness for the chemical vapour deposition process is from about 0.2 $\mu$m to about 3 $\mu$m, the thicker films being used to achieve specific microwave properties for the electrodes.

The electrode array on the silicon dioxide layer is conveniently formed by defining the required electrode pattern on the surface of the silicon dioxide, using a known form of photolithography process, and then depositing metal on the photolithographed pattern. To give adequate bonding with the silicon dioxide, the deposited metal may comprise a keying layer of chromium followed by a layer of gold, deposited on the chromium. The gold protects the chromium from effects of corrosion and deterioration and also permits the easy connection of wires for driving signals.

The manufacturing method is generally completed by etching away the silicon dioxide buffer from the gaps between the deposited electrodes, whereafter the wafer is packaged using conventional technology. However, the use of a CVD process can give a layer of excellent electrical quality and the packaging step may then be modified or eliminated.

Figure 1:
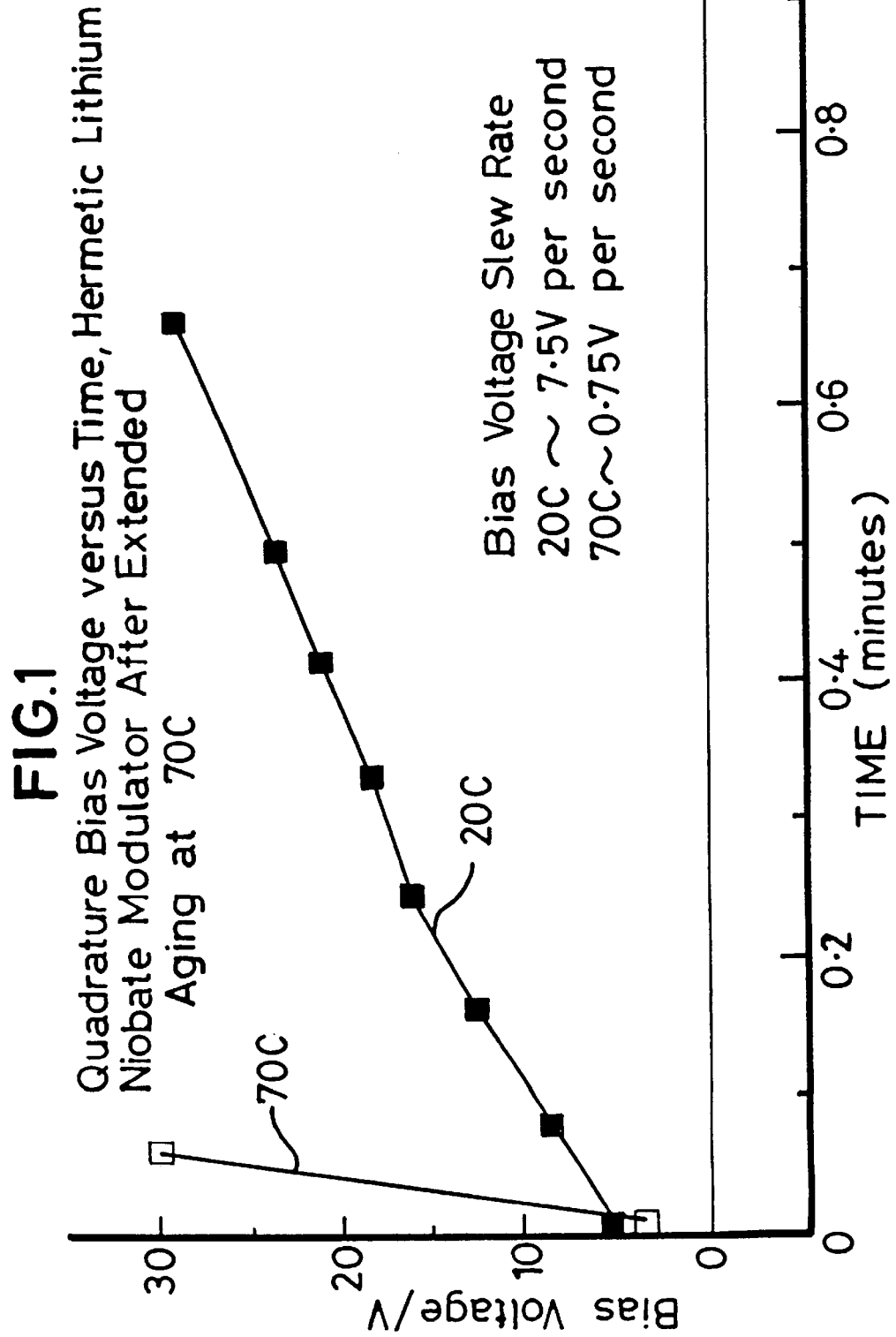
FIG. 1 shows the bias voltage slew rate for a failed hermetically-sealed lithium niobate integrated optical component exhibiting FBD.

Referring now to the drawings, FIG. 1 shows the bias voltage slew rate for a failed lithium niobate optical modulator after extended ageing at 70° C., typically for a few hundred hours. The device displays fast bias drift (FBD) where the bias required to achieve quadrature rapidly increases with time. As can be seen, the FBD depends strongly upon the temperature. In each case, the bias voltage rapidly reached the maximum available of 30 volts, from the power supply employed, with a time constant of only seconds.

Figure 2:
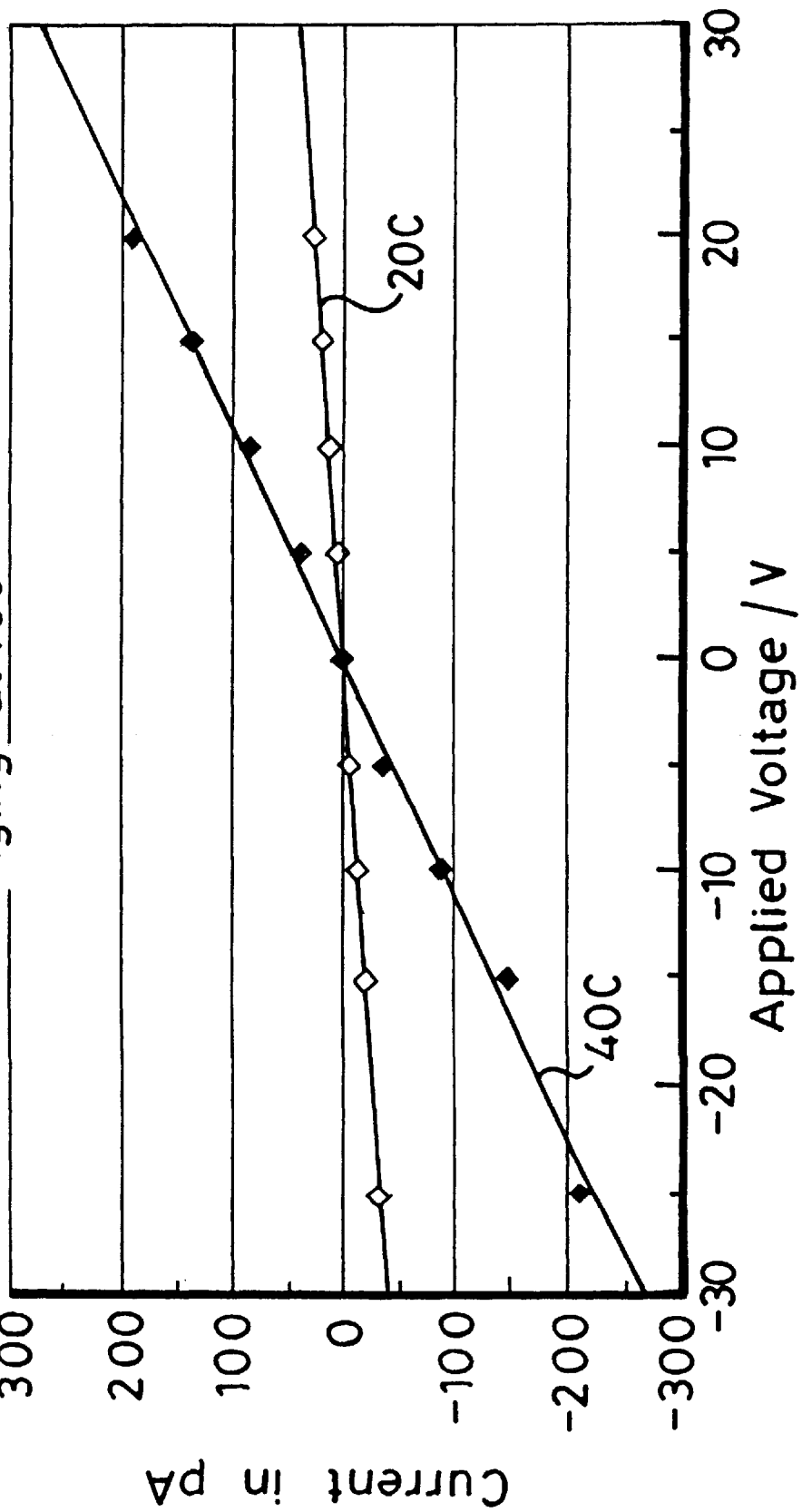
FIG. 2 shows the I–V characteristics for the failed device of FIG. 1.

FIG. 2 shows the I–V characteristics of the bias electrode of a failed device, after extended ageing at 70° C. Two sets of readings were taken, respectively at 20° C. and 40° C. and it can be seen that the device displays relatively low substantially linear resistivities.

Figure 3:
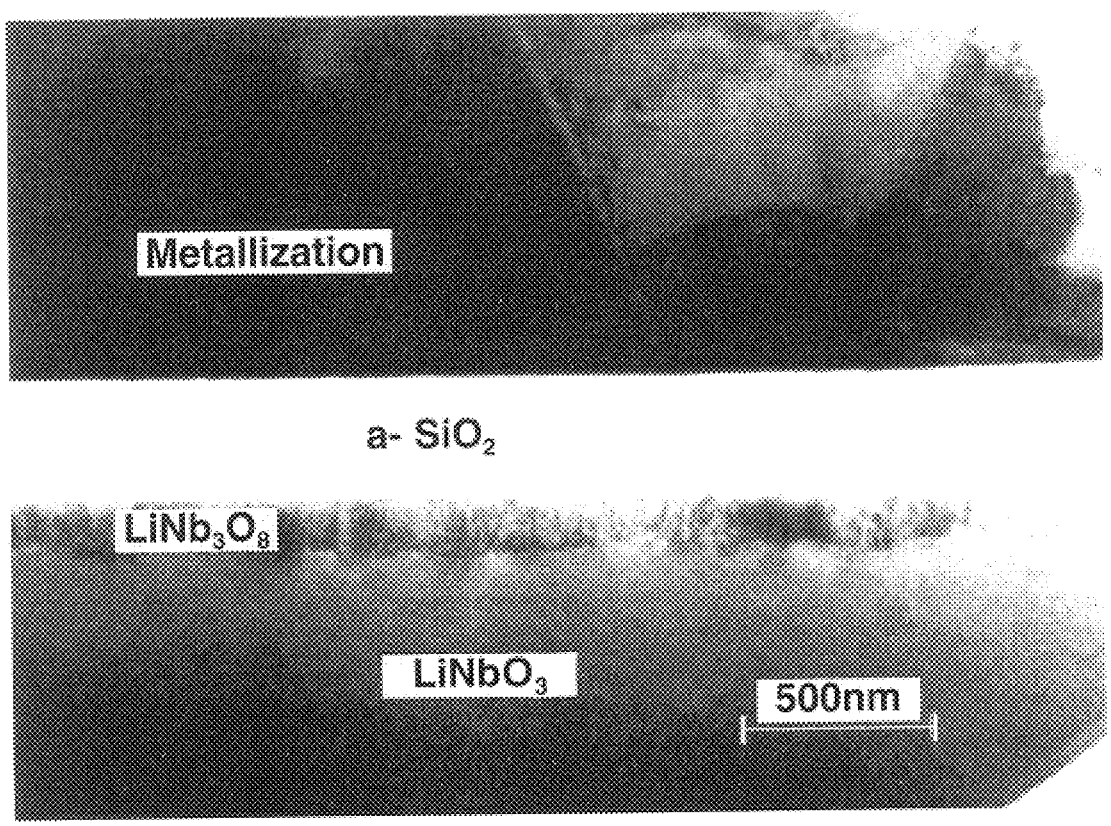
FIGS. 3 and 4 are photomicrographs showing the damaged lithium niobate layer and the silicon dioxide buffer layer containing lithium, respectively.
Figure 4:
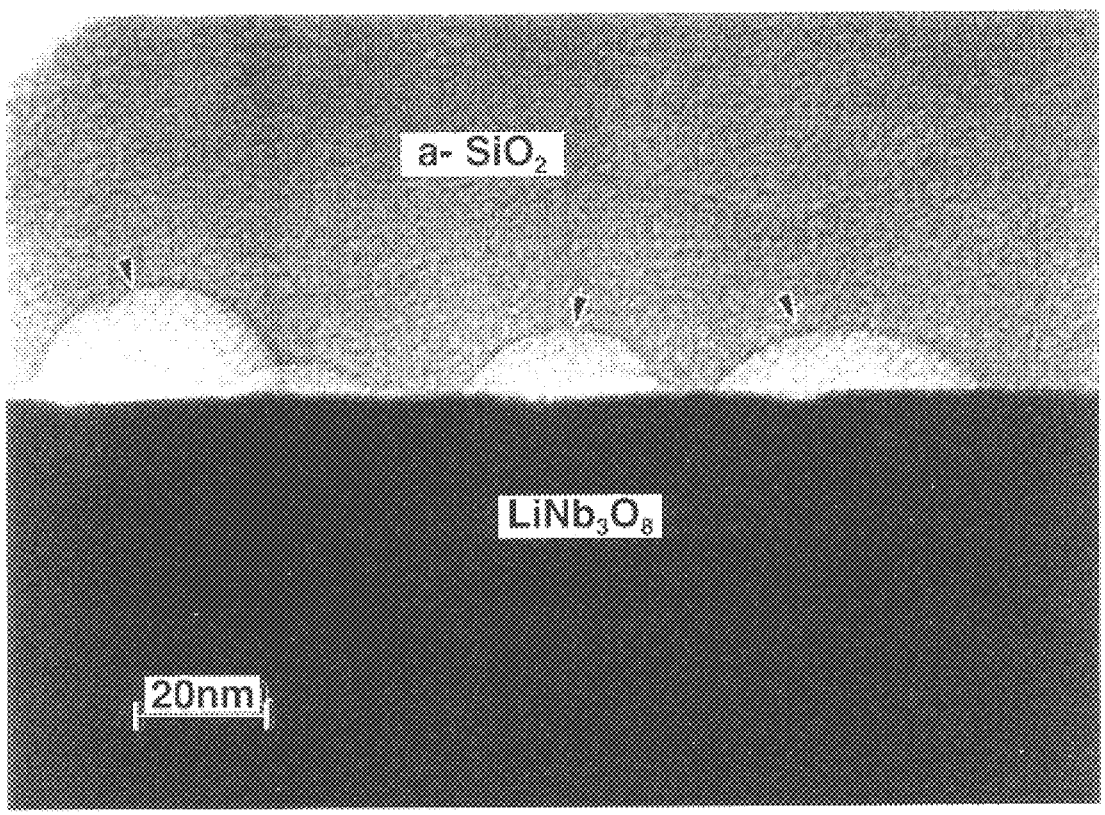

The photomicrographs of FIGS. 3 and 4 show the depletion of lithium oxide in the upper layer of the lithium niobate wafer, following the annealing of the silicon dioxide buffer layer (FIG. 3) and the presence of lithium in the silicon dioxide buffer layer following that annealing (FIG. 4).

Figure 5:
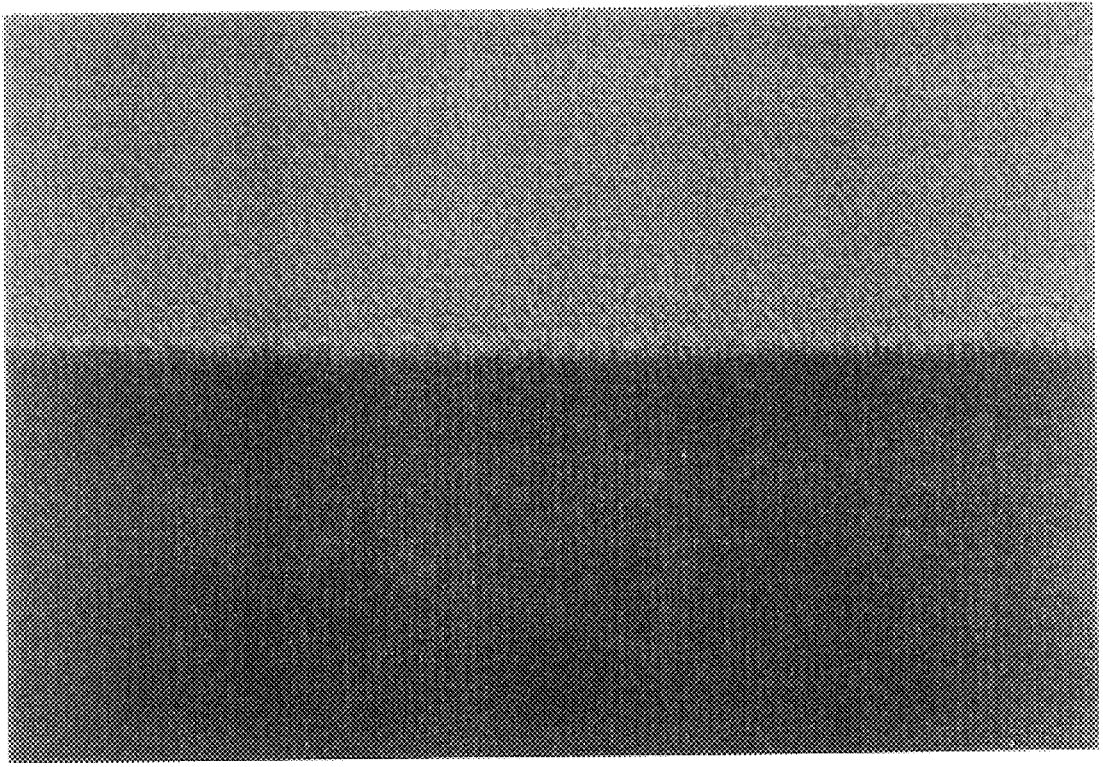
FIG. 5 is a photomicrograph of a low-temperature plasma-enhanced chemical vapour deposition silicon dioxide layer on a lithium niobate wafer.

The analysis of wafers processed with a conventional PECVD buffer layer under standard operating conditions also showed the presence of a damaged $LiNb_3O_8$ layer. This is because it has been presumed it is necessary to perform the process with a substrate temperature in excess of 300° C. However, further research and refinement of the PECVD process has shown that it is possible to perform that process at temperatures less than 250° C. and FIG. 5 shows a layer produced at such a temperature. The PECVD process has now further been defined to allow operation at around 200° C., where it can be shown one is close to the onset of a damaged layer but one still can achieve a silicon dioxide film of high quality, both physically and electrically. Tests on such a low temperature deposited film have shown resistivities in the region of $10^{15}$ ohm-cm, as compared to typical figures of $10^8$ to $10^9$ ohm-cm achieved with conventional electron beam evaporation deposition and annealing processes.

Devices fabricated with this PECVD film have been hermetically packaged and have been operating for extended periods, at temperatures in the range of 70° C. to 100° C., without exhibiting FBD.

EXAMPLE 1

Titanium Diffusion

A lithium niobate wafer was used for the fabrication of an integrated optical circuit having an optical waveguide extending along a surface and with an electro-structure overlying the optical waveguide to enable the electrical control of light propagating along the guide. The fabrication sequence comprised the steps of:

1. Depositing and patterning a layer of titanium as a diffusant on the surface of the lithium niobate wafer, the titanium layer having a thickness in the region of about 600 Å to about 1200 Å;

2. Indiffusing the titanium layer by heating the lithium niobate wafer to a temperature in the range of about 1000° C. to about 1050° C., for a time of between 6 and 15 hours, which time must be sufficient to create an optical waveguide, in a controlled atmosphere;

3. Depositing a silicon dioxide buffer layer by the use of a PECVD process with a substrate temperature in the region of about 170° C. to about 225° C., said layer having a thickness of about 0.2 $\mu$m to about 3 $\mu$m; and 4. Depositing and patterning an electrode layer, which comprises an initial key layer of chromium with a thickness of about 50 Å to about 250 Å, and a layer of gold which is at least 0.2 μm thick.

EXAMPLE 2

Proton Exchange

This Example is similar to that described above, except that the optical waveguide fabrication of steps 1 and 2 above are performed in the following way:
1. The wafer is patterned using a photolithography process and is then immersed in a source of protons, at a temperature of about 150° C. to about 250° C., for a time of about 5 minutes to 90 minutes; and
2. Annealing the wafer at a temperature of about 250° C. to about 350° C., for a period of about 1 hour to about 10 hours.

EXAMPLE 3

Nickel Diffusion

This method is similar to that of Example 1 except that steps 1 and 2 are replaced by the following steps:
1. Patterning and depositing a layer of nickel as the diffusant, the thickness of the deposited layer being about 400 Å to about 1000 Å; and
2. Diffusing the nickel into the wafer by heating the lithium niobate to a temperature in the range of 800° C. to about 1100° C., for a time of between 4 and 12 hours, which time must be sufficient to create an optical waveguide, in a controlled atmosphere.

EXAMPLE 4

Zinc Diffusion

This method is similar to that of Example 1 except that steps 1 and 2 are replaced by the following steps:
1. Patterning and depositing a layer of zinc or zinc oxide as the diffusant, the thickness of the deposited layer being about 400 Å to about 1000 Å; and
2. Diffusing zinc into the wafer by heating the lithium niobate to a temperature in the range of 800° C. to about 1100° C., for a time of between 4 and 12 hours, which time must be sufficient to create an optical waveguide, in a controlled atmosphere.

We claim:

1. A method of manufacturing an integrated optical device, comprising the steps:
    forming an optical waveguide in a wafer of lithium niobate by diffusing into the wafer from a surface thereof a material which changes the refractive index of the lithium niobate;
    using a chemical vapor deposition process to deposit on said surface of the wafer a silicon dioxide buffer layer, with the temperature of the wafer substantially in the region of about 170° C. to 225° C. thereby preventing the formation of a layer of $LiNb_3O_8$;
    depositing on the silicon dioxide buffer layer a metallic electrode array; and
    mounting the wafer in a package, effecting suitable optic and electric connections thereto and hermetically sealing the connected wafer inside the package.

2. A method as claimed in claim 1, wherein the silicon dioxide buffer layer is formed by a plasma-enhanced chemical vapor deposition process.

3. A method as claimed in claim 2, wherein the chemical vapor deposition process is performed with the wafer at a temperature not substantially greater than 200° C.

4. A method as claimed in claim 3, wherein the chemical vapor deposition process is performed with the wafer at a temperature not substantially greater than 200° C.

5. A method as claimed in claim 2, wherein the silicon dioxide buffer layer is formed by an electron cyclotron resonance chemical vapor deposition process.

6. A method as claimed in claim 5, wherein the chemical vapor deposition process is performed with the wafer at a temperature not substantially greater than 200° C.

7. A method as claimed in claim 1, wherein the optical waveguide is formed by depositing on the wafer a material consisting of one of the group consisting of a metal and a metal-bearing compound, and diffusing metal from the deposited material into the wafer by soaking the wafer and the deposited material at an elevated temperature for an extended time.

8. A method as claimed in claim 7, wherein the deposited material is selected from the group consisting of titanium, titanium dioxide, nickel, zinc and zinc dioxide.

9. A method as claimed in claim 1, wherein the optical waveguide is formed by forming on the surface of the wafer the required optical waveguide pattern and then immersing the wafer in a source of protons at an elevated temperature for an extended time.

10. A method as claimed in claim 1, wherein the deposited silicon dioxide layer has a thickness in the range of about 0.2 μm to about 3 μm.

11. A method as claimed in claim 1, wherein the electrode array is formed by lying out on the wafer surface the electrode pattern by a photolithography step and then depositing metal on the photolithographed pattern.

12. A method as claimed in claim 11, wherein the deposited metal comprises a first layer of chromium and a second layer of gold deposited on the chromium.

13. A method as claimed in claim 1, wherein the deposition of the electrode array defines gaps between the electrodes of said array, and the silicon dioxide buffer layer is etched away from the gaps between the deposited electrodes, following the formation thereof.

14. An integrated optical device whenever made by a method of claim 1.

15. An integrated optical modulator whenever made by a method of claim 1.

16. A method of manufacturing an integrated optical device, the method comprising the steps of:
    forming an optical waveguide in a wafer of lithium niobate by diffusing into the wafer from a surface thereof a material which changes the refractive index of the lithium niobate;
    depositing on said surface of the wafer a silicon dioxide buffer layer by vapor deposition and preventing the formation of a layer of $LiNb_3O_8$ during the step of depositing by maintaining the temperature of the wafer substantially in the region of 170° C. to 225° C.;
    depositing a metallic electrode array on the silicon dioxide buffer layer;
    mounting the wafer in a package;
    effecting suitable optic and electric connections to the wafer; and
    hermetically sealing the connected wafer inside the package.

17. A method as claimed in claim 16, wherein the silicon dioxide buffer layer is formed by a plasma-enhanced chemical vapor deposition process.

18. A method as claimed in claim 17, wherein the chemical vapor deposition process is performed with the wafer at a temperature not substantially greater than 200° C.

19. A method as claimed in claim 16, wherein the silicon dioxide buffer layer is formed by an electron cyclotron resonance chemical vapor deposition process.

20. An integrated optical device formed by the method comprising the steps of:

forming an optical waveguide in a wafer of lithium niobate by diffusing into the wafer from a surface thereof a material which changes the refractive index of the lithium niobate;

depositing on said surface of the wafer a silicon dioxide buffer layer by vapor deposition and preventing the formation of a layer of $LiNb_3O_8$ during the step of depositing by maintaining the temperature of the wafer substantially in the region of 170° C. to 225° C.;

depositing a metallic electrode array on the silicon dioxide buffer layer;

mounting the wafer in a package;

effecting suitable optic and electric connections to the wafer; and hermetically sealing the connected wafer inside the package.

* * * * *